United States Patent [19]

Garnier

[11] Patent Number: 4,583,428
[45] Date of Patent: Apr. 22, 1986

[54] WHEEL HUB WITH INTEGRAL PLANETARY SPEED REDUCER

[75] Inventor: Michel Garnier, Courbevoie, France

[73] Assignee: SO.M.A. Europe Transmissions Societe Nouvelle Mecanique et Automobile, Saint Ettenne, France

[21] Appl. No.: 547,900

[22] Filed: Nov. 2, 1983

[30] Foreign Application Priority Data

Nov. 3, 1982 [FR] France .................. 82 18403

[51] Int. Cl.⁴ .................. F16H 3/44; F16H 57/10
[52] U.S. Cl. .................. 74/785; 180/9.62; 180/70.1; 180/10
[58] Field of Search .................. 74/785, 781 R; 180/9.62, 10

[56] References Cited

U.S. PATENT DOCUMENTS

| | | | |
|---|---|---|---|
| 2,899,005 | 8/1959 | Speicher | 180/10 |
| 2,998,735 | 9/1961 | Elfes | 180/70.1 X |
| 3,043,155 | 7/1962 | Salua | 180/70.1 X |
| 3,115,204 | 12/1963 | Dence | 74/785 |
| 3,184,994 | 5/1965 | Stahl | 180/10 |
| 3,452,612 | 7/1969 | Casey | 180/70.1 X |
| 4,010,830 | 3/1977 | Logus et al. | 192/4 A |
| 4,029,166 | 6/1977 | Haak et al. | 180/9.62 |
| 4,082,156 | 4/1978 | Krolak et al. | 180/9.62 |
| 4,131,169 | 12/1978 | Eickhoff et al. | 180/9.62 |
| 4,407,382 | 10/1983 | Dziuba et al. | 180/10 |

FOREIGN PATENT DOCUMENTS

| | | | |
|---|---|---|---|
| 242367 | 12/1962 | Australia | 180/9.62 |
| 674757 | 11/1963 | Canada | 74/785 |
| 1106612 | 5/1961 | Fed. Rep. of Germany | |
| 2154474 | 5/1972 | Fed. Rep. of Germany | |
| 2262623 | 6/1973 | Fed. Rep. of Germany | 180/9.62 |
| 2305780 | 8/1974 | Fed. Rep. of Germany | 174/785 |
| 2392279 | 12/1978 | France | |
| 2479746 | 10/1981 | France | |
| 0033437 | 3/1979 | Japan | 180/9.62 |
| 8002821 | 12/1980 | PCT Int'l Appl. | |
| 8103469 | 12/1981 | PCT Int'l Appl. | |
| 1594972 | 8/1981 | United Kingdom | |
| 2073115 | 10/1981 | United Kingdom | |

*Primary Examiner*—George H. Krizmanich
*Assistant Examiner*—Dirk Wright
*Attorney, Agent, or Firm*—Charles E. Brown; Charles A. Brown

[57] ABSTRACT

The invention provides a modification to a wheel hub of the kind comprising a hollow body housing a wheel speed reducer having a pinion carrier which is locked for rotation with the hollow body. According to the invention, splined mounting means is provided between the pinion carrier and the hollow body for locking the pinion carrier in rotation with the hollow body. Mounting means of this kind require only a small radial space, and the radial bulk of the assembly can therefore be reduced with this arrangement. The invention is particularly applicable to the hubs of driving wheels for industrial vehicles, agricultural machines, public works machines and load-handling machines.

9 Claims, 5 Drawing Figures

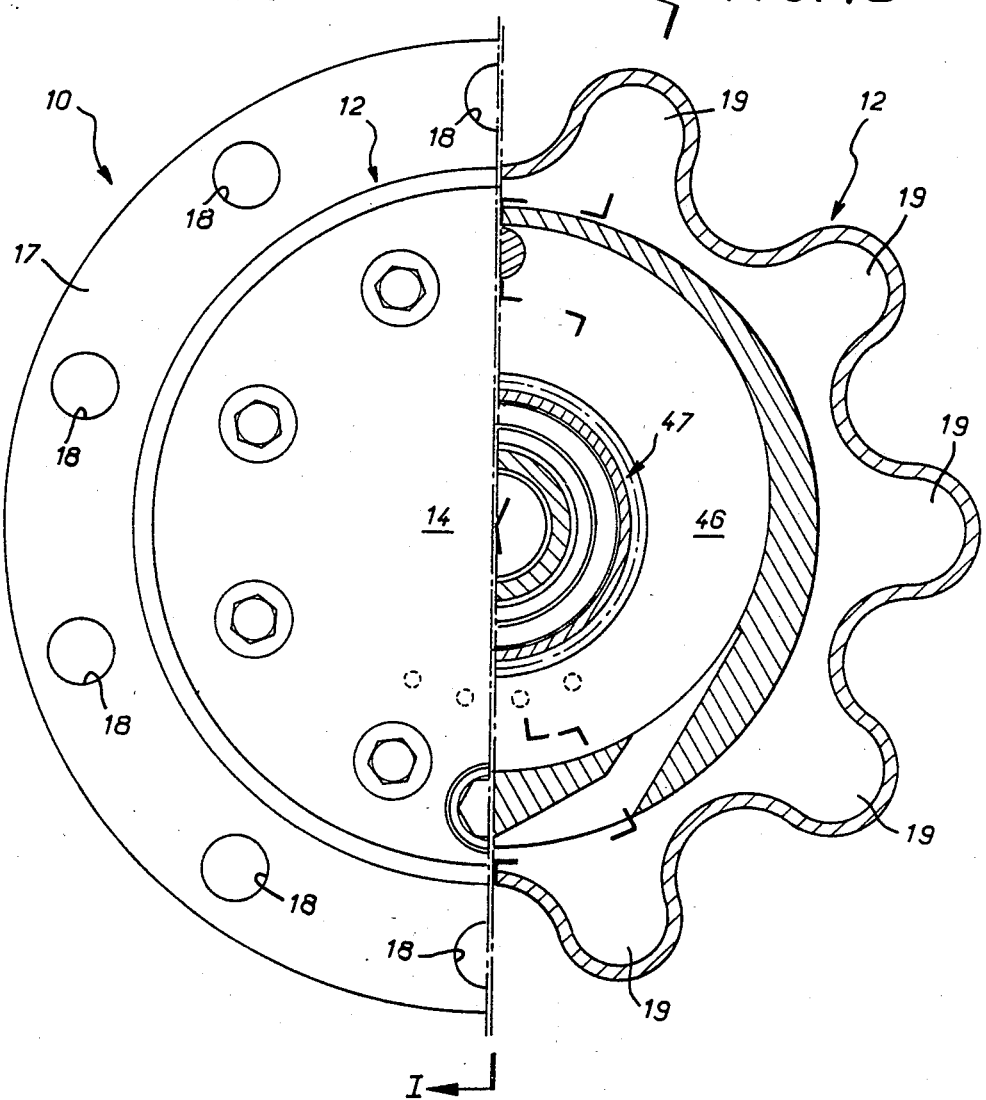

WHEEL HUB WITH INTEGRAL PLANETARY SPEED REDUCER

The present invention relates in general to a wheel hub with an integral speed reducer, of the kind employed, for example, in industrial vehicles, agricultrual machines, public works machines, and load-handling machines such as cranes or bridge-layers.

In general, a wheel hub of this kind comprises a hollow body, which is mounted to rotate on a support sleeve, usually called a stub, and, within the hollow body, and operable to reduce the speed of rotation of the latter in service to a permissible value, there is a wheel speed reducer having a pinion carrier rotatably locked to the hollow body.

When as is most frequently the case, the hollow body is tubular overall, being closed transversally on the side opposite the stub by a removable cover which is supported on it axially and which, in practice, is attached to it by screws engaging in the thickness of its section, the pinion carrier is most frequently formed directly by this cover and forms an integral part thereof.

This is the case, for example, in the construction described in French Patent Application filed on 3rd Apr. 1981 under No. 81/06903 and published under No. 2,479,746.

This is also the case in the construction described in International Patent Application filed on 28th May 1980 under No. PCT/US80/00644 and published under No. WO 81/03469.

Thus, the screws employed to secure the cover to the hollow body also ensure the fixing in rotation of the pinion carrier to the hollow body. Because these screws have to be able to withstand the shear torque to which they are unavoidably subjected in use, they are necessarily of a considerable diameter. For their installation, at least the corresponding section of the hollow body must therefore be of an appropriate size. This unavoidably results both in a significant radial bulk of the assembly, and in an increase in weight, and hence inertia, of the latter.

The general object of the present invention is an arrangement which makes it possible to eliminate this disadvantage, and which moreover results in other advantages.

SUMMARY

The present invention provides a wheel hub, of the kind comprising an overall tubular hollow body, which is mounted to rotate on a support sleeve, commonly called a stub, and, disposed in the said hollow body, a wheel reducer, whose pinion carrier is locked for rotation with the said hollow body, this wheel hub being characterized in that, for the locking in rotation of the pinion carrier and the hollow body, a grooved fitting is provided between the pinion carrier and the hollow body.

Such a grooved fitting requires only a minimum radial development, so that, other conditions being equal, the radial bulk of the assembly is advantageously reduced.

In practice, as the hollow body is closed transversally on the side opposite the stub by a removable cover which rests on it axially, the pinion carrier forms a part which, being separate from the cover, is coupled to the latter by axial ties, and, in the direction of the cover, the pinion carrier rests axially on removable abutment means, itself locked axially on the hollow body.

Such an abutment means can advantageously consist very simply of an elastic split washer engaged in a groove provided in the hollow body.

Experience indicates, quite surprisingly, that an elastic split washer is perfectly capable of taking up the axial thrust to which the pinion carrier is subjected in use, even when, as is most frequently the case in practice, the hub includes a brake in its hollow body, in addition to a wheel reducer.

Preferably, however, to avoid excessive bending of the elastic split washer, and thus to protect the washer, the cover has an axial extension terminating at a point immediately adjacent the washer and which is thus capable of counter-supporting it axially if necessary.

Be that as it may, as a result of the arrangement according to the invention, the pinion carrier itself ensures the axial support of the cover, the means of abutment against which it bears axially for this purpose, and which is itself locked axially on the hollow body, being in a way gripped between the pinion carrier and the cover.

Furthermore, due to the grooved mounting by which the pinion carrier is locked axially on the hollow body, and also because of the unavoidable fitting clearances intervening between the various parts with which it engages, the pinion carrier is advantageously liable, within certain limits, to tilt relative to the axis of the assembly.

This results in a more or less floating fitting of the planetary pinions carried by the pinion carrier relative to the ring gear with which these planetary pinions engage in a conventional manner.

Such a floating fitting is desirable because it enables the planetary pinions to center of their own accord with respect to the ring gear, and thereby produce a better meshing of the teeth of the planetary pinions with those of the ring gear, leading to a reduction in friction between the teeth and, consequently, both to a decrease in the temperature of the assembly and an increase in its efficiency.

To ensure such a floating fitting of the planetary pinions relative to the ring gear, provision is usually made to separate the associated ring gear carrier from the crown wheel and to introduce a grooved fitting between the ring gear and carrier.

According to the invention, the ring gear can, if required, be continuous with its carrier. This results in a simplification of the whole assembly.

BRIEF DESCRIPTION OF THE DRAWINGS

FIG. 4A is a half end view of the wheel hub, following the arrow IVA of FIG. 1, and FIG. 4B is, in addition, a half-view in axial cross-section along the line IVB—IVB of this FIG. 1.

DESCRIPTION OF THE PREFERRED EMBODIMENTS

Figure 1:
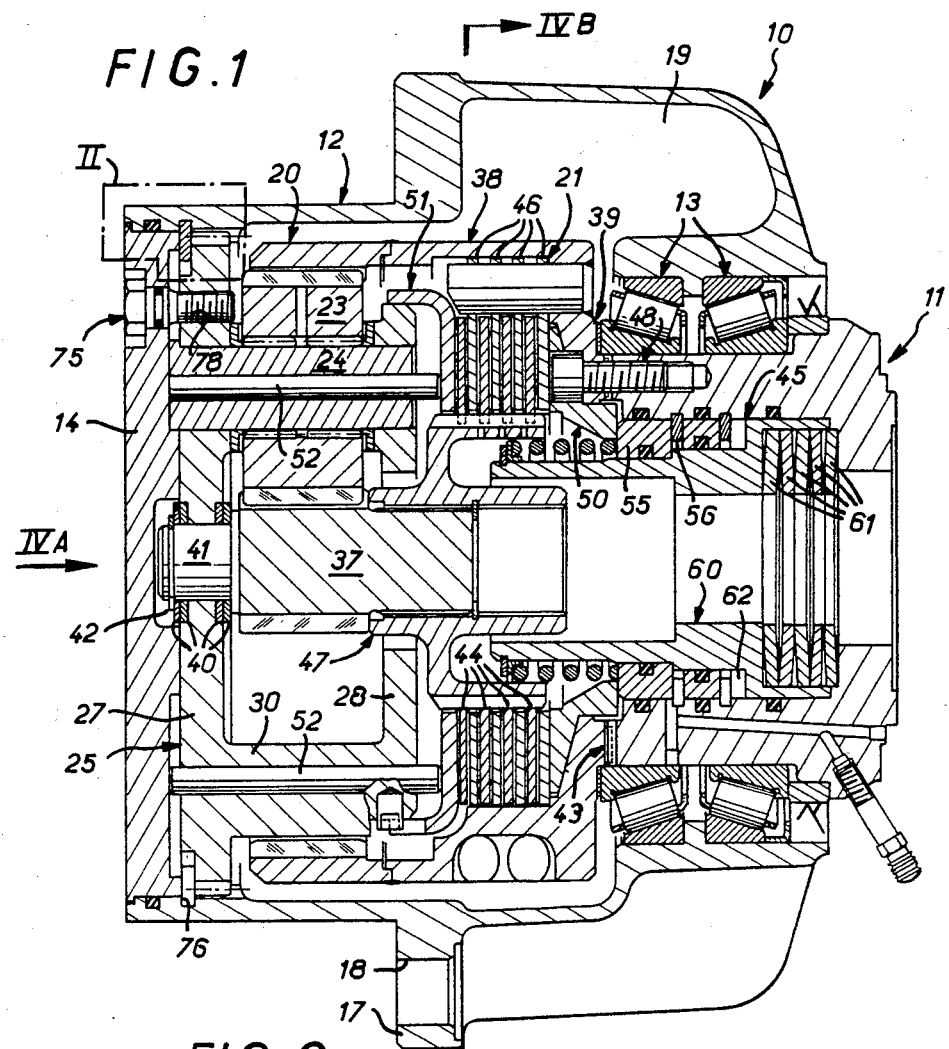
FIG. 1 is a view in axial cross-section of a wheel hub according to the invention, along the broken line I—I of FIG. 4b.

In known manner the wheel hub 10 according to the invention, which is in practice a hub of a driving wheel, is intended to be fitted on a fixed support sleeve 11, generally called a stub, which is itself supported by a rigid or steering axle in which is mounted in rotation the corresponding wheel shaft.

The latter has not been shown in the figures.

In a manner which is also known, the wheel hub 10 according to the invention comprises an overall tubular hollow body 12 which, internally, is mounted in rotation on the stub 11, with the interposition of two bearings 13, and which, according to the arrangements described in more detail below, is closed transversally by a removable cover 14 on the side opposite the stub 11.

Externally, the hollow body 12 has a flange 17 to which the wheel concerned (not shown in the figures) can be fitted through its lateral extension, this flange 17 having for this purpose passages 18 at intervals suitable for fitting wheel studs.

In the embodiment shown, the hollow body 12 is circularly wave-shaped on the side of the flange opposite the cover 14, i.e. the side of this flange situated on the side of the stub 11, and thus forms, radially, cavities 19.

A speed reducer 20 is disposed within the hollow body 12, at the side of the cover 14.

In the embodiment shown, there is additionally arranged a brake 21, on the side of the stub 11.

In known manner, the wheel speed reducer 20 comprises a plurality of planetary pinions 23, which are regularly arranged in a circle around the axis of the assembly and which are each individually mounted to rotate around supporting shafts 24, themselves carried by a pinion carrier 25.

According to arrangements described in greater detail hereinafter, this pinion carrier 25 is locked to the hollow body 12 for rotation with the hollow body.

In practice, the pinion carrier 25 comprises, transversally, two flanges 27, 28 the first in the immediate vicinity of the cover 14 and the second at a distance from the cover, between which extend the support shafts 24 of the planetary pinions 23, and which flanges are axially joined to each other by arms 30 alternating in a circle with the said support shafts 24.

In known manner the planetary pinions 23 act between a pinion shaft or sun gear 37, intended to be fixed rigidly in rotation to the associated wheel shaft, and a crown or ring gear 38 fixed rigidly to a transverse supporting flange 39 for rotation with the flange 39, generally called a sun gear carrier and being locked to the stub 11.

In the embodiment shown, the sun gear 37 is locked axially to the transverse flange 27 of the pinion carrier 25, through the intermediacy of friction washers 40, the pinion shaft 37 having an axial extension 41 passing through the transverse flange 27 and, at its end, carries an elastic split ring 42 to maintain the whole assembly axially.

Furthermore, in this embodiment, the ring gear 38 is formed axially in two parts which are suitably joined together, for example, by welding, as shown, and between its ring gear carrier 39 and the stub 11 there are disposed in combination, at the end of the said stub 11, on the one hand means for positive locking 43, acting circumferentially, for the required locking in rotation, and on the other hand, screws 48, acting axially.

These arrangements, not being a part of the present invention, will not be described here in further detail.

The same applies in relation to the structure of the brake 21 and the means for control associated with it.

It will suffice to state that such a brake comprises a plurality of brake discs 44 which are locked in rotation on a carrier hub 47 and which, alternating with the insert discs 46 which are locked in rotation on the sun gear carrier 39, are capable, under the control of a control unit 45, of being subjected to an axial clamping between, on the one hand, a pressure plate 50 and, on the other hand, a bearer plate 51, itself axially bearing on the cover 14 through the intermediary of small columns or pins 52 passing axially through the support shafts 24 of the planetary pinions 23 and the arms 30 of the pinion carrier 25.

In the embodiment shown, the control unit 45 comprises a servo piston 55, whose cylinder 56 is capable of being connected to a source of fluid under pressure, and an emergency or parking piston 60 which, subjected to a stack of Belleville washers 61, is capable of acting on the servo piston 55, and whose cylinder 62 is normally connected to a source of fluid under pressure different from that preceding, to ensure its retention.

In practice, in the embodiment shown, it is through the intermediary of the hub 47 carrying the brake discs 44 that the sun gear 37 is capable of being rigidly connected in rotation to the associated wheel shaft, this carrier hub 47 being splined internally so that it can engage both on the sun gear 37 and on the associated wheel shaft.

According to the invention, a grooved or splined mounting 70 is provided between the pinion carrier 25 and the hollow body 12, for the locking in rotation of the pinion carrier 25 on the hollow body 13.

In the embodiment shown, this grooved mounting 70 is established between the peripheral section of the transverse flange 27 of the pinion carrier 25 and the inner wall of the hollow body 12, the peripheral section having for this purpose teeth 71 projecting radially and engaging with teeth 72 which also project radially for this purpose on the inner wall.

Furthermore, the pinion carrier 25 forming a distinct part of the cover 14, and the cover 14 bearing axially, as described later, on the hollow body 12, the pinion carrier 25 is fastened by axial ties 75 to the cover 14 and, in the direction of the latter, it bears axially on a removable abutment means 76, itself locked axially to the hollow body 12.

In the embodiment shown, the axial ties 75 consist of screws which, distributed uniformly in a circle, pass in a leakproof manner through the cover 14 and are engaged by screwing in tapped openings 78 provided for this purpose in the transverse flange 27 of the pinion carrier 25, the abutment means 76 consists of an elastic split washer engaged in a groove 79 provided for this purpose in the hollow body 12 and, to support axially the cover 14 which closes the hollow body, this hollow body 12 has, at the inner edge of its corresponding section, a step 80, the cover 14 having, projecting radially, a collar 81 which, complementing the step 80 in the hollow body 12, can cooperate in abutment with the hollow body.

Preferably, and as shown, the cover 14 has, in the direction of the elastic split washer forming the abutment means 76, an axial extension 82 which extends as far as the immediate vicinity of the abutment means 76.

In practice, however, taking into account unavoidable manufacturing tolerances, a play J1, which is minimal, is left axially between the end of the axial extension 82 of the cover 14 and the elastic split washer forming the abutment means 76.

Figure 2:
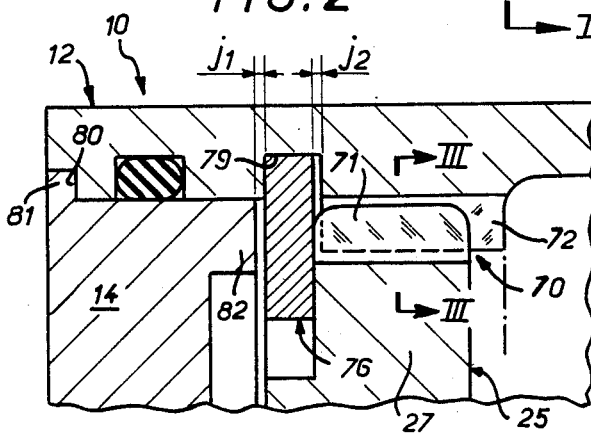
FIG. 2 reproduces, on a larger scale, the detail of FIG. 1 marked by a frame II in the latter.
Figure 3:
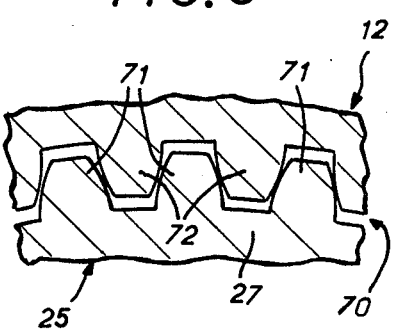
FIG. 3 is a partial view in transversal cross-section of the wheel hub according to the invention, along the line III—III of FIG. 2.

This play J1 has been deliberately exaggerated in FIG. 2, to make the play clearer.

This is also the case for the play J2 which may be exhibited, as shown, in the groove 79 of the hollow body 12 with which it is in contact, by the elastic split washer forming the abutment 76.

Whatever the case, when the screws forming the ties 75 are screwed, the cover 14 comes to rest axially, by its collar 81, on the hollow body 12 and, jointly, the pinion carrier 25 comes to rest axially, by its transverse flange 27, against the elastic split washer forming the abutment means 76, the abutment means 76 itself coming to rest axially against a flank of the groove 79, with which it engages, in the hollow body 12, the flank in question being that nearest to the cover 14.

Thus, according to the invention, the pinion carrier 25 itself ensures the axial maintenance of the cover 14 and, equally, the cover ensures its own axial maintenance.

Conjointly, taking into account unavoidable manufacturing tolerances which have not all been shown in FIG. 2, in contrast to the plays J1 and J2 discussed earlier, and, also taking into account the flexibility of the elastic split washer forming the abutment 76, the mounting of the pinion carrier 25 with respect to the body 12 is floating, within certain limits and regardless of its locking in rotation on the latter.

According to the invention, and as explained above, this is exploited to join the ring gear 38 rigidly to its carrier 39.

In the embodiment shown, the ring gear 38 is in practice continuous with its carrier 39.

On account of the removability of the elastic split washer forming the abutment means 76, it is possible, if necessary, to have easy access to the internal space of the hollow body 12.

It suffices, in fact, to ensure in succession, after withdrawing the screws forming the ties 75, the removal of the cover 14, of the elastic split washer forming the abutment means 76 and of the pinion carrier 25.

The present invention is not limited to the embodiment described and shown, but comprises any alternative form.

I claim:

1. A wheel hub with an integral planetary speed reducer, said wheel hub comprising an overall tubular hollow body mounted to rotate on a support sleeve, said planetary speed reducer being disposed inside said hollow body for reducing the rotational speed of an input shaft transmitted to said hollow body, said planetary speed reducer including a pinion carrier, planetary gears carried by said pinion carrier, a ring gear meshed with said planetary gears, a splined connection between said pinion carrier and said hollow body and including splines formed directly on said pinion carrier and at the outer periphery of said pinion carrier radially outwardly of said ring gear cooperating with complementary splines formed on a facing internal wall portion of said hollow body.

2. A wheel hub with an integral planetary speed reducer, said wheel hub comprising an overall tubular hollow body mounted to rotate on a support sleeve, said planetary speed reducer being disposed inside said hollow body for reducing the rotational speed of an input shaft transmitted to said hollow body, said planetary speed reducer including a pinion carrier, a splined connection between said pinion carrier and said hollow body and including splines formed at the outer periphery of said pinion carrier cooperating with complementary splines formed on a facing internal wall portion of said hollow body, said hollow body having an open end, a removable abutment means fixed axially on an internal wall portion of said hollow body, said pinion carrier bearing axially in the direction of said open end against said abutment means.

3. A wheel hub according to claim 2, wherein said hollow body open end is closed by a removable cover, said cover bearing axially against said hollow body, said cover being separate from said pinion carrier and fixed thereto by axial ties.

4. A wheel hub according to claim 2, wherein said removable abutment means is in the form of an elastic split washer received in a groove formed in said internal wall portion of said hollow body.

5. A wheel hub according to claim 4, wherein said hollow body open end is closed by a removable cover, said cover has a peripheral axial extension which terminates axially adjacent said elastic split washer.

6. A wheel hub according to claim 3, wherein said hollow body has a step at said open end engaged with a ccoperable radially projecting collar provided at the periphery of said cover.

7. A wheel hub according to claim 3, wherein said axial ties comprise threaded fasteners sealingly extending through said cover and threadedly engaged in openings in said pinion carrier.

8. A wheel hub according to claim 3, wherein said pinion carrier axially determines the position of said cover in said hollow body.

9. A wheel hub according to claim 1, wherein a radial support flange formed in one-piece construction with said ring gear fixed against rotation relative to the support sleeve.

* * * * *